United States Patent [19]

Tumber

[11] 4,363,073
[45] Dec. 7, 1982

[54] VARIABLE CAPACITOR TRANSDUCER

[75] Inventor: Brian W. Tumber, Greenford, England

[73] Assignee: Lucas Industries Limited, Birmingham, England

[21] Appl. No.: 217,467

[22] Filed: Dec. 17, 1980

[30] Foreign Application Priority Data

Jan. 19, 1980 [GB] United Kingdom ............... 8001837

[51] Int. Cl.³ .............................................. H01G 5/12
[52] U.S. Cl. .................................. 361/292; 361/278; 361/280
[58] Field of Search ............... 361/278, 292, 280, 291

[56] References Cited

U.S. PATENT DOCUMENTS

| 932,111 | 8/1909 | Fessowden | 361/292 X |
| 2,464,582 | 3/1949 | Keim | 361/278 |
| 2,575,199 | 11/1951 | Stutt | 361/292 X |
| 2,881,372 | 4/1959 | Dublier | 361/278 |
| 3,147,374 | 9/1964 | Diamond | 361/292 X |
| 3,222,591 | 12/1965 | Mynall | 361/292 X |

FOREIGN PATENT DOCUMENTS

| 1109253 | 7/1954 | France | 361/278 |
| 1279984 | 6/1972 | United Kingdom | 361/292 |

Primary Examiner—Elliot A. Goldberg

[57] ABSTRACT

A transducer for providing signals representative of the axial setting of an angularly movable component comprises a member having a first series of zones thereon, said zones having the same circumferential width and axial length and a sensing device having a sensing surface presented to the zones. As the area of the zones in turn presented to the surface of the device varies a fluctuating electrical signal is obtained which varies with the relative axial setting of the member and device. Calibration zones can be located between the zones respectively.

3 Claims, 8 Drawing Figures

VARIABLE CAPACITOR TRANSDUCER

This invention relates to a transducer for providing signals representative of the axial setting of an angularly movable component.

The object of the invention is to provide a transducer for the purpose specified in a simple and convenient form.

According to the invention a transducer for the purpose specified comprises a generally cylindrical member coupled in use, to said component so as to be axially and angularly movable therewith, a plurality of circumferentially spaced zones on the periphery of said member, said zones being of substantially equal circumferential length, the zones extending from one end of the member and terminating in a generally radial plane disposed between the ends of the member, and a sensing device having a sensing surface presented to but spaced from the surface of the member, the sensing surface having a fixed area and the sensing device having a fixed axial position, the sensing surface being responsive to the nature of said zones whereby the sensing device provides a fluctuating electrical signal indicative of the areas of said zones which pass beneath the sensing surface, and hence the relative axial position of the member and the sensing device.

Examples of transducers in accordance with the invention will now be described with reference to the accompanying drawings in which.

Figure 1:
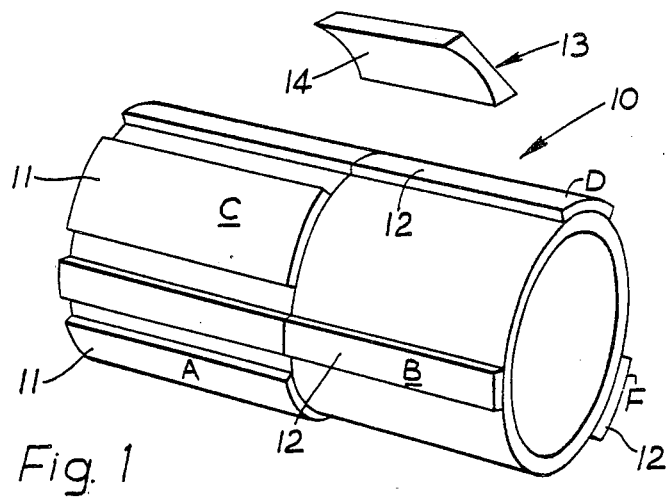
FIG. 1 is a perspective view of one example of a transducer.

Referring to FIG. 1 of the drawings, the transducer comprises a generally cylindrical elongated member 10 formed from metal and which is coupled to or forms part of a rotary component, the axial position of which can vary in use. The transducer is designed to provide signals from which can be determined the axial position of the component within a housing.

The surface of the member is provided with a plurality of raised zones, which for convenience are divided into two sets. The zones of the first set are referenced 11 and those of the second set 12. Moreover, as will be seen from FIG. 2 there are three zones in each set and each zone is provided with a respective reference letter.

The zones 11 extend from one end of the member and terminate in a radial plane between the ends of the member. They thus have the same axial length and in addition they have the same circumferential length. The circumferential spacing between the zones 11 is the same being in the example, 60°.

The zones 12 are located in the gaps between the zones 11 respectively and extend the full axial length of the member. The circumferential lengths are however different.

Positioned adjacent the member 10 is sensing device 13 which in the example is a plate of a capacitor. The device defines a surface 14 presented to the surface of the member and which has substantially the same curvature as the surface of the member, but is spaced therefrom. The device 13 in use is fixed within a housing containing the member in a position as shown in FIG. 2, such that it partially overlaps the zones 11.

Figure 2:
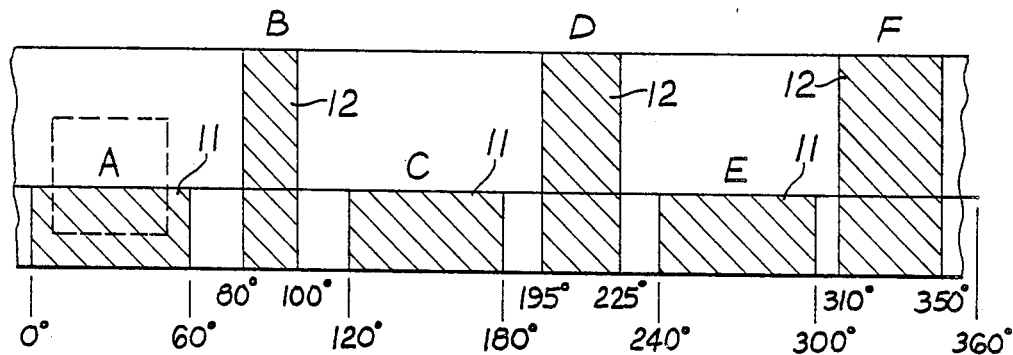
FIG. 2 is a developed view of a part of the transducer of FIG. 1.

As the member rotates the capacitance value as measured between the member 10 and the device 13 will vary and ignoring for the moment, the zones 12, as the zones 11 pass beneath the surface 14 the capacitance value will rise from a minimum in practice, substantially zero, to a maximum when the surface 14 fully overlaps the zones 11 in the circumferential direction, i.e. as shown in dotted outline in FIG. 2. These values will be the same for each of the zones 11 providing the distance between the zones 11 and the surface 14 does not vary. If the member is moved axially the capacitance value will change and the greater the overlap in the axial direction, the greater the capacitance value. By calibration the capacitance value can be related to the extent of overlap in the axial direction and hence the relative axial position of the device 13 and the member 10 and therefore the axial position of the component within the housing.

If the nature of the dielectric between the device 13 and the member 10 varies, there will be a change in the capacitance value and the calibration will be upset. Moreover, drift may occur in the electronic circuits which are utilised to measure and provide an indication of the capacitance value. The zones 12 are provided for the purpose of providing calibration points.

As mentioned above the zones 12 are of unequal circumferential length. The width of the zone 12 which is referenced B is arranged conveniently such that when under the surface 14, the capacitance value will be less than the minimum value which is possible when the surface 14 is overlapping the zones 11. The zone 12 referenced F is arranged to provide the maximum value of capacitance and conveniently it has a circumferential length substantially equal to that of the surface 14. The zone 12 which is referenced D has a circumferential length such that an intermediate value of capacitance is provided.

Figure 3:
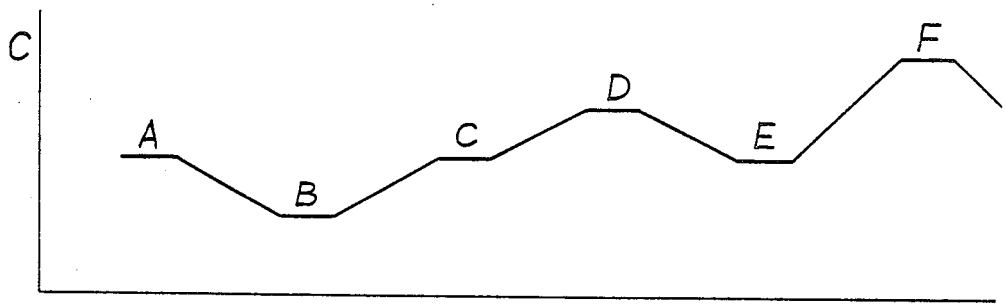
FIG. 3 is a graph showing the variation in a signal produced by the transducer of FIG. 1.

FIG. 3 shows the variation of the capacitance value for one revolution of the member 10 and with a fixed relative axial setting of the member and device. The relative capacitance values will remain the same even if the dielectric between the device and the member changes. The capacitance values as provided by the zone 12 enable the electronic circuits utilised for measuring the capacitance value and providing the position signal, to be self calibrating.

Figure 4:
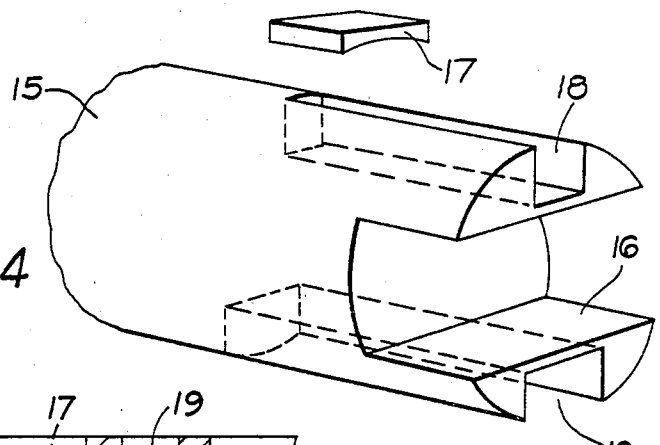
FIG. 4 is a perspective view of another example of a transducer.
Figure 5:
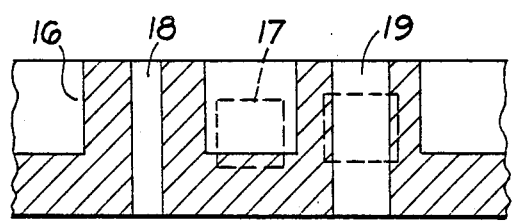
FIG. 5 is a view similar to FIG. 2 of the transducer shown in FIG. 4.

Turning now to FIG. 4, instead of forming the zones as projecting portions on the surface of the member as is the case with the example shown in FIG. 1, the spaces between the zones may be formed by slots. In FIG. 4, the member 15 is of cylindrical construction and is provided with a transversely extending slot 16. This is readily formed using a milling cutter. The outer edges of the base wall of the slot 16 lie in the aforesaid common radial plane and the sensing device 17 is positioned accordingly, its circumferential length being less than that of the slot 16. Ignoring for the moment the remaining slots, the capacitance value between the device 17 and the member 15, will decrease from a maximum to a value which is determined by the axial position of the member 15 as when the device 17 extends partly over the slot 16. Two further slots 18, 19 are cut into the surface of the member and these slots as shown in FIG. 4, are of unequal circumferential length. The circumferential length of slot 18 is substantially less than that of the device 17 whilst the circumferential length of the slot 19 is only slightly less than that of the device 17. Moreover, the slots 18, 19 extend rearwardly beyond the base wall of the slot 16. As the member rotates the sensing device 17 will be exposed to the slots 18, 19 to give high and low values of capacitance respectively. The high capacitance value is attained when the device 17 lies over the slot 18 and the low value when the device lies over the slot 19. The measured value of capacitance is obtained as described earlier.

Figure 6:
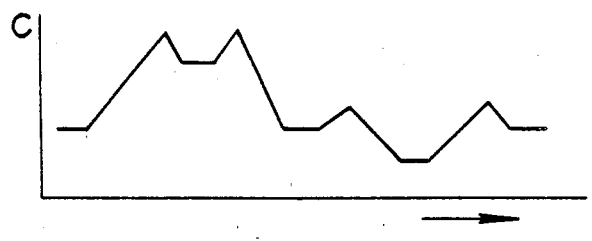
FIG. 6 is a graph similar to FIG. 3 but relative to the example of FIG. 5, and FIGS. 7 and 8 are views similar to FIGS. 1 and 2 showing another example of a transducer.

FIG. 6 shows the variation in the capacitance value as the device 17 moves relative to the slots etc.

Figure 7:
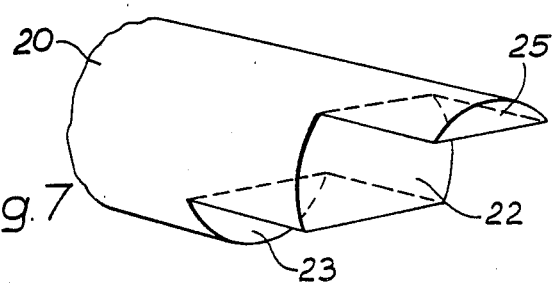
Figure 8:
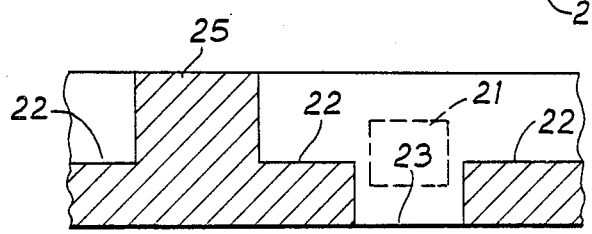

In the transducer shown in FIGS. 7 and 8 the member 20 is again of cylindrical form but it is provided with a pair of steps 22, 23. Again these can very readily be formed by a milling cutter, the end surface is referenced 25 and the same references are used on the developed view of FIG. 8. The device 21 has a circumferential length which is less than that of the recess defined by the step 23 and also the portion disposed between the end surface 25 and the step 22 In this case therefore the capacitance value goes from a maximum value corresponding to the portion of the member between the end surface 25 and the step 22, through the measured value which depends upon the relative axial setting of the member in particular the step 22 and the device and to the minimum value corresponding to the devide being in the position shown in FIG. 8.

As described the devices 13, 17 and 21 are in effect plates of a capacitor and it is the capacitance value which is sensed. As an alternative the zones may be of a magnetic nature, in which case the devices will be responsive to the magnetic field produced by the zones remembering of course that the device must have a finite area in order to provide a signal representative of the relative axial position of the member and device. The devices may be of a light sensitive type in which case the zones will be of different density.

I claim:

1. A transducer for providing signals representative of the axial setting of an angularly movable component comprising a generally cylindrical member coupled in use, to said component so as to be axially and angularly movable therewith, a plurality of circumferentially spaced zones on the periphery of said member, said zones being defined by raised portions of substantially equal circumferential length on the surface of said member and being equiangular spaced, the zones extending from one end of the member and terminating in a generally radial plane disposed between the ends of the member, a sensing device having a sensing surface presented to but spaced from the surface of the member, the sensing surface having a fixed area and the sensing device having a fixed axial position, the sensing surface being responsive to the nature of said zones whereby the sensing device provides a fluctuating electrical signal indicative of the areas of said zones which pass beneath the sensing surface, and hence the relative axial position of the member and the sensing device, and further zones defined by raised portions on the surface of said member located between said first mentioned zones respectively and having differing circumferential lengths, said further zones each having areas presented to the sensing surfae, the areas of said further zones presented to the sensing surface being substantially constant irrespective of the relative axial position of the component and sensing device.

2. A transducer for providing signals representative of the axial setting of an angularly movable component comprising a generally cylindrical member coupled in use, to said component so as to be axially and angularly movable therewith, said member being provided with a transverse slot extending through the member defining a plurality of circumferentially spaced zones on the periphery of said member, said zones being of substantially equal circumferential length, the zones extending from one end of the member and terminating in a generally radial plane disposed between the ends of the member, a sensing device having a sensing surface presented to but spaced from the surface of the member, the sensing surface having a fixed area and the sensing device having a fixed axial position, the sensing surface being responsive to the nature of said zones whereby the sensing device provides a fluctuating electrical signal indicative of the areas of said zones which pass beneath the sensing surface, and hence the relative axial position of the member and the sensing device, and a pair of slots of differing circumferential width formed in the member substantially at right angles to the transverse slot, said pair of slots having a greater axial length than said transverse slot and defining further zones located between said first mentioned zones, said further zones each having areas presented to the sensing surface, the areas of said further zones presented to the sensing surface being substantially constant irrespective of the relative axial position of the component and sensing device.

3. A transducer for providing signals representative of the axial setting of an angularly movable component comprising a generally cylindrical member coupled in use, to said component so as to be axially and angularly movable therewith, said member being provided with a pair of axially spaced steps, a plurality of circumferentially spaced zones on the periphery of said member, said zones being of substantially equal circumferential length, the zones extending from one end of the member and terminating in a generally radial plane disposed between the ends of the member, a sensing device having a sensing surface presented to but spaced from the surface of the member, the sensing surface having a fixed area and the sensing device having a fixed axial position, the sensing surface being responsive to the nature of said zones whereby the sensing device provides a fluctuating electrical signal indicative of the areas of said zones which pass beneath the sensing surface, and hence the relative axial position of the member and the sensing device, and further zones located between said first mentioned zone, said further zones each having areas presented to the sensing surface, the areas of said further zones presented to the sensing surface being substantially constant irrespective of the relative axial position of the component and sensing device.

* * * * *